United States Patent [19]

Cho

[11] Patent Number: 4,977,923

[45] Date of Patent: Dec. 18, 1990

[54] PILOT-CONTROLLED WATER PRESSURE-OPERATED DIAPHRAGM SHUT-OFF VALVE

[76] Inventor: Chan-Dong Cho, 334-42 Yunhee-Dong, Seodaemoon-Gu, Seoul 120-110, Rep. of Korea

[21] Appl. No.: 346,879

[22] Filed: May 3, 1989

[30] Foreign Application Priority Data

May 4, 1988 [KR] Rep. of Korea .................. 88-6797
Feb. 23, 1989 [KR] Rep. of Korea .................. 89-1924

[51] Int. Cl.$^5$ .................. F16K 31/128; F16K 31/34
[52] U.S. Cl. .................. 137/414; 137/403; 251/30.03; 251/45
[58] Field of Search .................. 137/414, 403; 251/45, 251/30.03

[56] References Cited

U.S. PATENT DOCUMENTS 4,640,309 2/1987 Hoffman et al. .......... 137/596.14 X

FOREIGN PATENT DOCUMENTS

54-40520 3/1979 Japan .

Primary Examiner—Gerald A. Michalsky
Attorney, Agent, or Firm—Reising, Ethington, Barnard, Perry & Milton

[57] ABSTRACT

A pilot controlled diaphragm shut-off valve (13) includes a cushion body (22) disposed in a pilot pressure chamber (20). The cushion body (22) operates to gradually allow the build up of pressure in the pilot pressure chamber (20) as water enters through a pilot orifice (21a) into the pilot pressure chamber (20). Such gradual pressure build up in the pilot pressure chamber (20) allows a gradual closing velocity of the shut-off diaphragm valve (13) and thereby eliminates the water hammer phenomena. An actuating diaphragm (32) is provided for opening and closing a pilot valve (24). Alternatively, a float (43) may be employed for opening and closing the pilot valve (24). Either the actuating diaphragm (32) or the float (43) is linked to a stem (23) and lever (26) mechanism, or alternatively to a magnetic linkage (40, 41, 42a).

5 Claims, 11 Drawing Sheets

PILOT-CONTROLLED WATER PRESSURE-OPERATED DIAPHRAGM SHUT-OFF VALVE

TECHNICAL FIELD

The present invention relates to a diaphragm shutoff valve for a differential pressure valve controlled by a pilot valve, and which may be operated by a solenoid coil.

BACKGROUND ART

Simple diaphragm shut-off valves are well known in the prior art and typically employed to control a water supply, such as in a washing machine or the like. More particularly, in controlling the supply of water to a tank or to the reservoir of a chamber pot, it has been known to use a float valve. Such a float valve is coupled to a lever mechanism for controlling the supply of water in response to the level of water in the tank or reservoir.

The prior art diaphragm shut-off valves are deficient in that, because the valve operates in response to a differential pressure on opposite sides of the valve, a water hammer effect is generated whenever the water supply is shut-off. Further, the float valve of the prior art contributes to the water hammer effect because the float valve ultimately controls an outlet itself which shuts off water supply. Further, the prior art float valves have heretofore required a large float and a relatively long lever in order to generate a large enough force. Such large float and long lever requirements require a relatively large space in which to install them and a large force to properly operate them. Additionally, the float valve and lever linkage, because of the harsh operation environment, is required to be fabricated with precision, and out of durable and corrosion resistant materials.

The prior art has attempted to address the water hammer problem inherent with diaphragm shut-off valves, as illustrated in the U.S. Pat. No. 3,672,627. In this reference, a diaphragm shut-off valve responsive to differential impressure includes a plastic insert comprising a necked portion of the diaphragm entering into a fluid outlet. The necked portion causes a throttling effect of the fluid flowing therethrough, and thereby purports to reduce the water hammer effect.

In the Japanese Utility Model Provisional Publication No. 54-40520, a tapered part is inserted into the fluid flow outlet. This tapered part causes a gradual reduction in the velocity of the fluid flow, and thereby purports to eliminate the water hammer effect. Nevertheless, there have remained problems in the prevention of the water hammer effect which have not been adequately solved. Particularly, when the closing velocity of the shut-off valve is rapid at high fluid pressures, the attempted solutions to the water hammer effect have been ineffective.

The prior art has suggested that the water hammer problems can be solved if the closing velocity of the diaphragm valve is gradually reduced. Heretofore, in very large differential pressure valves, a form of damper has been installed in the concentric shaft of the diaphragm shut-off valve for the purpose of reducing the closing velocity of the shut-off valve. However, this form of damper has been impossible or very impractical to install in small sized differential pressure valves due to structuring problems, economy, etc.

SUMMARY OF THE INVENTION AND ADVANTAGES

The subject invention contemplates a pilot controlled diaphragm shut-off valve which is operated by pressure change of a pilot pressure chamber. The valve comprises a volumetrically deformable elastic cushion body which is disposed in a pilot pressure chamber for a pilot valve. The pilot valve is moveable between open and closed positions by an actuator.

The subject invention provides a cushion body disposed in the pilot pressure chamber for eliminating the problem arising when a water supply valve is used as a differential pressure valve. The subject invention is advantageous in the prevention of the water hammer effect.

The subject invention also provides a convenient, more adaptable, pilot valve controlled water supply valve which is operated by a diaphragm or a float. The float required to operate the subject invention can be smaller than a conventional float, and can be installed in a smaller space than a conventional float valve.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1A:
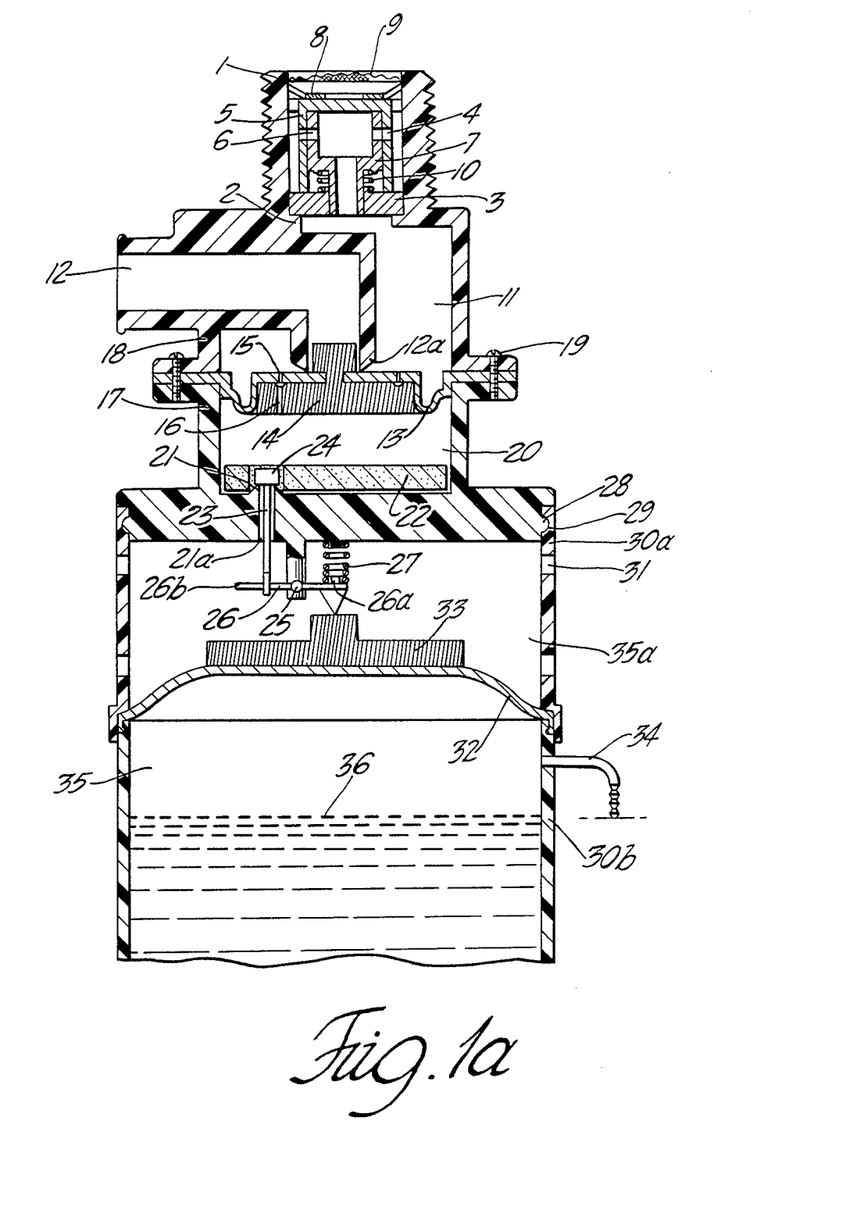
FIG. 1a is a cross-sectional view of the subject invention disposed in a closed state, and with water being supplied from the upper side.
Figure 1B:
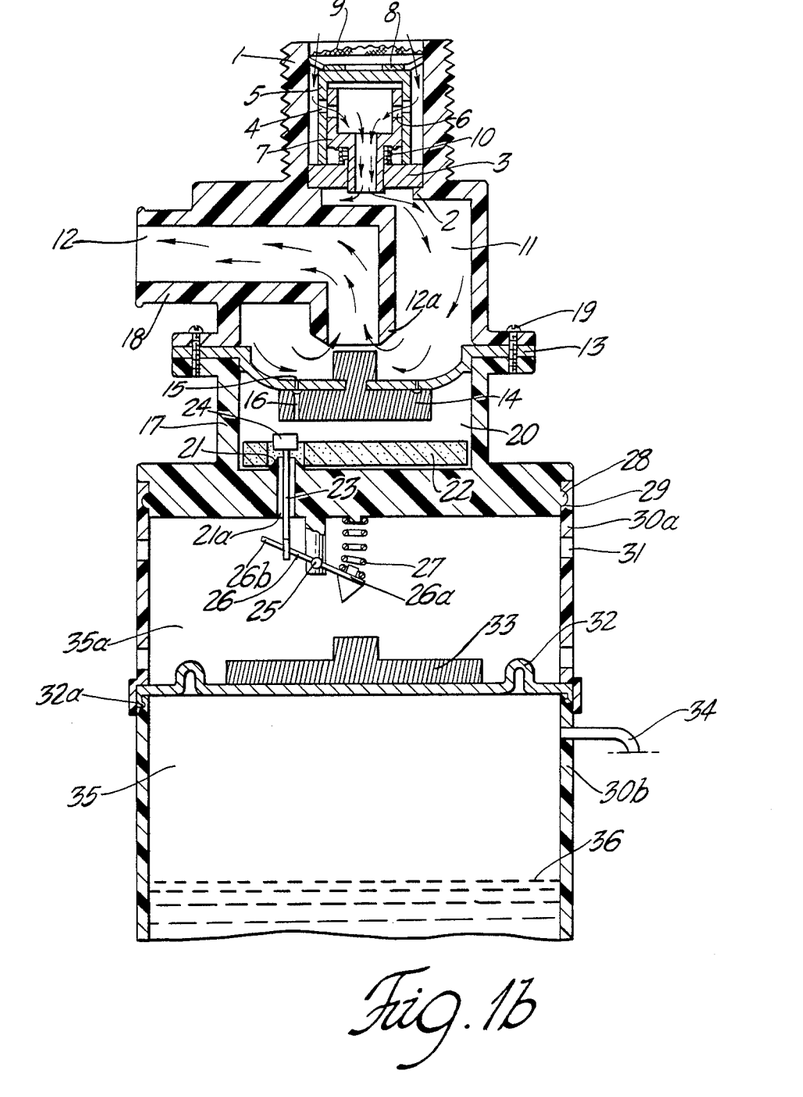
FIG. 1b is a cross-sectional view of the subject invention shown disposed in an open state.

As shown in FIGS. 1a and 1b, the subject invention includes a water supplying inlet 1. The water supplying inlet 1 extends to a lower part 2 or shoulder, against which a circular support 3 is disposed. A stepped diameter sliding sleeve 7 is inserted in the water supplying inlet 1, and supported by a spring 10 adjacent the circular support 3. The sliding sleeve 7 includes a flow control hole 6.

A cap member 5, having a generally inverted U-shaped cross section, is slideably disposed about the exterior of the sliding sleeve 7. The cap member 5 includes a flow control hole 4 disposed to communicate with the flow control hole 6 of the sliding sleeve 7. A stopper 8 fixedly supports the cap member 5 in the water supplying inlet 1. A filter 9 is disposed in the water supplying inlet 1, upstream of the stopper 8.

A diaphragm shut-off valve 13 is provided downstream of the water supplying inlet 1. A reinforcing disk 14 is fixedly attached to the diaphragm shut-off valve 13. The diaphragm valve 13 divides an inlet 11 and an outlet 12, when disposed in the closed state as shown in FIG. 1a. However, when the diaphragm valve 13 is disposed in an open state, as shown in FIG. 1b, fluid is allowed to flow between the inlet 11 and the outlet 12. The diaphragm valve 13 is fixedly supported between a lower housing 17 and an upper housing 18. A plurality of bolts 19 extend between the upper 18 and lower 17 housings and through an outer flange of the diaphragm valve 13 to support the assembly in place. The upper central portion of the diaphragm valve 13 is adapted to engage the diaphragm valve seat 12a.

A pilot pressure chamber 20 is disposed below the diaphragm valve 13, within the lower housing 17. The diaphragm valve 13 and reinforcing disk 14 are provided with a plurality of screened orifices 15, 16 which allow the passage of fluid from the inlet 11 to the pilot pressure chamber 20, as is known in the prior art.

A cushion body 22 is disposed in the pilot pressure chamber 20. The cushion body 22 is fabricated from a soft rubber, such as a silicone sponge. The presence of the cushion body 22 and the pilot pressure chamber 20 effects a gradually varying change of pressure within the pilot pressure chamber 20. In other words, the cushion body 22 prevents rapid pressure changes in the pilot pressure chamber 20, and thereby reduces the opening and closing velocity of the diaphragm valve 13. The cushion body 22, therefore, prevents the undesirable water hammer effect from occurring in the subject invention.

A pilot valve 24 is fixedly attached to a downwardly extending stem 23. The pilot valve 24 is disposed to engage a pilot valve seat 21 which protrudes inwardly into the pilot pressure chamber 20. The stem 23 extends downwardly to a lever 26. The lever 26 is pivotally supported by a pivot 25. A spring 27 is attached to one end 26a of the lever 26 for forcing the pilot valve 24 to move out of engagement with the pilot valve seat 21. A circular protrude 28 is disposed along the outer perimeter of the lower housing 17. An outer tube 30b includes a groove 29 shaped along its inner periphery and adapted to snap-fit together with the circular protrude 28 of the lower housing 17. The outer tube 30a is provided with a plurality of holes 31. Another outer tube, 30b, extends downwardly from the outer tube 30a. The two outer tubes 30a, 30b are snap-fitted together. An actuating diaphragm 32 is supported between the two outer tubes 30a, 30b, at their place of connection. An annular end 32a of the actuating diaphragm 32 maintains a seal between the outer tubes 30a, 30b. A reinforcing disk 33 is fixedly attached to the actuating diaphragm 32 for transmitting force to one end of the lever 26. A flexible pipe 34 extends outwardly from the tube 30b and is capable of controlling the water level by lengthening or shortening the end of the flexible pipe 34.

The movement of the diaphragm valve 13 between the open state, as shown in FIG. 1b, and the closed state, as shown in FIG. 1a, will be described presently. As the water level, represented at 36, moves downwardly with the use of water, the air pressure, represented at 35, which is limited by the water level 36 and the actuating diaphragm 32, will be reduced. Accordingly, the pressure acting on the bottom of the actuating diaphragm 32 will be reduced. This causes the reinforcing disk 33 to move away from the lever 26, allowing the force of the spring 27 to rotate the lever 26 about the pivot 25. This causes the stem 23 to urge the pilot valve 24 upwardly, thereby disengaging the pilot valve 24 from the pilot valve seat 21.

This, in turn, allows the water disposed in the pilot pressure chamber 20 to flow out through the pilot orifice 21a and thereby causes a reduction of the pressure in the chamber 20. As a result, the force of water in the inlet 11, acting upon the diaphragm valve 13, forces the diaphragm 13 to depress and then move into the opened state, thereby allowing water to pass through to the outlet 12 and ultimately to the water reservoir.

As water flows through the water supplying inlet 1, the hydraulic pressure of the water causes the sliding sleeve 7 to move downwardly, against the biasing of the spring 10, thereby shifting the orientation of the control holes 4, 6 slightly to produce a constant, maintained water flow. As the water level in the water reservoir rises, the water level 36 likewise rises. This causes the air pressure 35 to increase against the bottom of the actuating diaphragm 32. increased air pressure 35, the actuating diaphragm 32 moves upwardly until the reinforcing disk 33 engages the lever 26.

On the opposite side of the actuating diaphragm 32, air disposed in the atmosphere chamber 35a is allowed to flow outwardly through the holes 31. The upward movement of the actuating diaphragm 32 and reinforcing disk 33 engages the lever 26 and overcomes the spring force of the spring 37. This causes the pilot valve 24 to engage and seal against the pilot valve seat 21.

Nevertheless, the water which continues to flow from the inlet 11 to the outlet 12 continues to enter the pilot pressure chamber 20 through the water orifices 15, 16. Because the pilot valve 34 is shut, the water flowing into the pilot pressure chamber 20 collects and begins urging the diaphragm valve 13 toward the seat 12a. However, because the cushion body 22 is disposed in the pilot pressure chamber 20, the hydraulic pressure in the chamber 20 will gradually increase. If an even more gradual increase in the pressure in the pilot pressure chamber 20 is desired, an even larger cushion body 22 may be provided. Accordingly, the diaphragm valve 13 gradually moves toward the seat 12a as water enters the pilot pressure chamber 20, and thereby gradually shuts off the water flow between the inlet 11 and the outlet 12, and positively prevents the water hammer phenomena.

At this time, there is a difference in the effect of operation between the enlarged pilot pressure chamber 20, and the enlarged pilot pressure chamber 20 having the cushion body 22.

Figure 2:
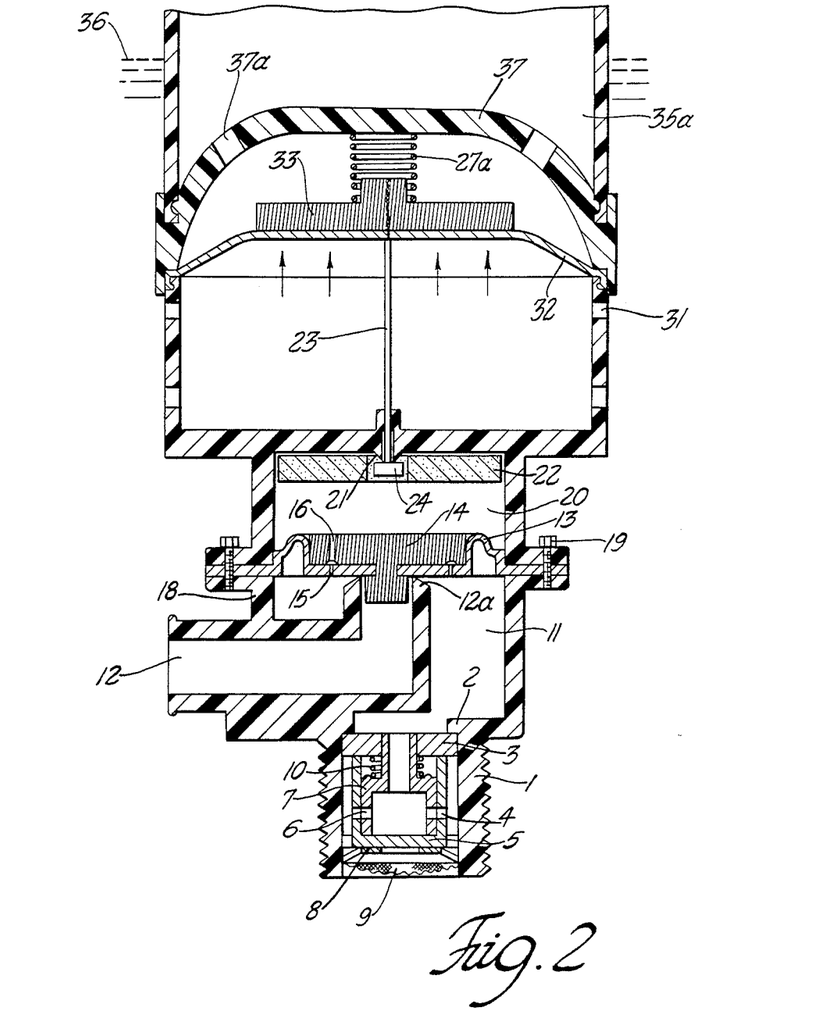
FIG. 2 is a cross-sectional view of the subject invention disposed in the closed state, with water being supplied from the lower side.
Figure 10A:
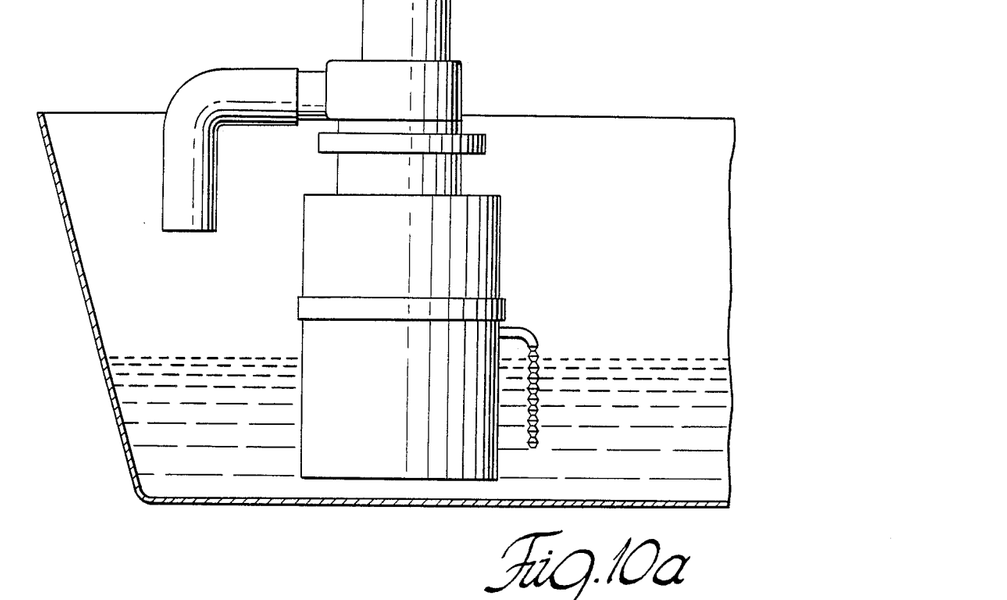
FIG. 10a is a front view of the subject invention disposed for operation in a water tank.
Figure 10B:
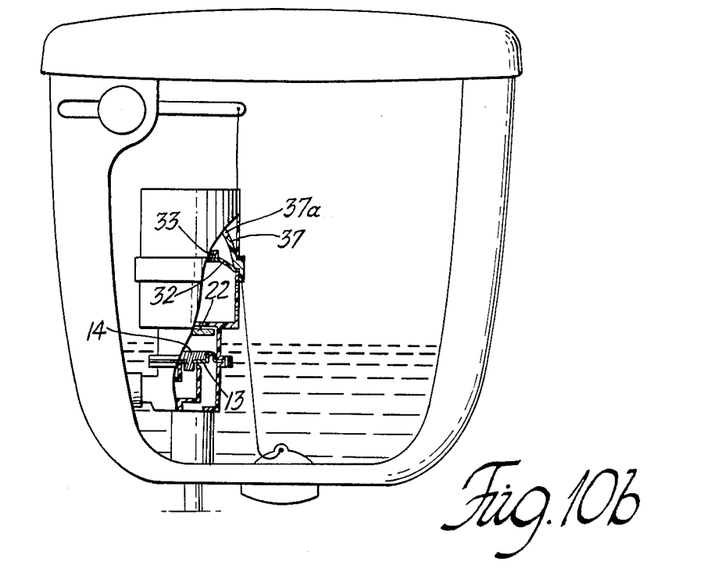
FIG. 10b is a partial cross-sectional view of the subject invention disposed for operation in the reservoir of a chamber pot.

Referring now to FIG. 2, a reversed cross-sectional view of FIG. 1a is illustrated. In this embodiment, water is supplied from the lower side of the unit as in the case of water being supplied into the reservoir of a chamber pot, as shown in FIG. 10. In comparison with FIG. 1a, FIG. 2 is shown including the pilot valve seat 21 positioned centrally in the lower housing 17. The stem 23 is secured to the reinforcing disk 33 of the actuating diaphragm 32, and extends directly to the pilot valve 24.

Also, a spring 27a is disposed between the upper side of the reinforcing disk 33 and a bracket 37. The bracket 37 is arranged to support the spring 27a, and includes a plurality of holes 37a.

In the operation of the alternative embodiment according to FIG. 2, the spring 27a forces the reinforcing disk 33 to move downwardly as the water level 36 moves downwardly. More specifically, as the water level 36 moves downwardly, the water pressure against the underside of the actuating diaphragm 32 is reduced, allowing the actuating diaphragm 32 to move downwardly, with the biasing spring 27a. This allows the valve 24 to move to an open position, thereby providing an escape for the water in the pilot pressure chamber 20 to flow out through the seat 21. Therefore, the hydraulic pressure in the pilot pressure chamber 20 is reduced. It will be appreciated that the operation of the diaphragm valve 13 is substantially as described in detail above. Additionally, the water level can be controlled according to the amount of water filled into the upper space 43a of the diaphragm 32.

Figure 3:
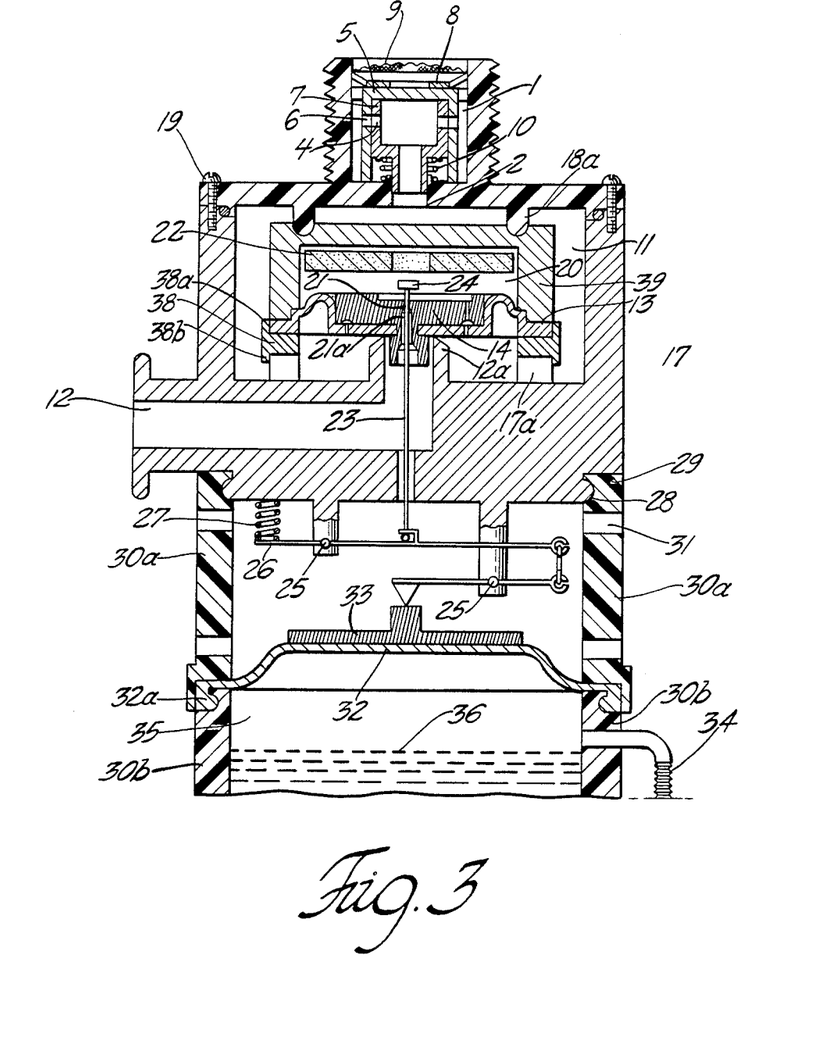
FIG. 3 is a cross-sectional view of an alternative embodiment of the subject invention disposed in the closed state and having water supplied from the upper side.

Referring now to FIG. 3, yet another embodiment of the subject invention is disclosed. The diaphragm valve seat 12a is provided within the lower housing 17, on which a plurality of protrudes 17a are arranged. A support ring 38 of the diaphragm 13 is provided and includes projections 38a, 38b. The diaphragm valve 13 is supported on the support ring 38.

In this embodiment, the pilot seat 21 is formed at the central portion of the reinforcing disk 14 of the diaphragm valve 13. The pilot valve 24 along with the attached stem 23 are arranged so as to pass through the reinforcing disk 14. A cap body 39, having a generally inverted U-shaped cross section, is disposed over the diaphragm valve 13 in order to form the pilot pressure chamber 20. The cap body 39 is depressed and supported by a plurality of protrudes 18a formed on the lower side of the upper housing 18. The upper 18 and lower 17 housings are fastened together by a plurality of bolts 19.

In the operation of the subject invention according to the embodiment illustrated in FIG. 3, it is shown that the reinforcing disk 33 of the actuating diaphragm 32 moves downwardly to open the pilot valve 24 via the spring 27. As the pilot valve 24 is opened, the water pressure in the pilot pressure chamber 20 is allowed to escape and thereby open the diaphragm valve 13. The closing of the diaphragm valve 13 is substantially identical to that described above in connection with the embodiment of FIGS. 1a and 1b.

In comparing FIG. 1a and FIG. 3, it is seen that the closing force of the pilot valve 23 applied by the reinforcing disk 33 is only applied against the pilot valve seat 21 in FIG. 1a. However, in FIG. 3, the open diaphragm valve 13 effectively moves the valve seat 21 closer to the open pilot valve 24. At low pressure of the inlet water, the different pressures on both sides of the diaphragm valve 13 is not large, although there is water leaking from the gap between the diaphragm valve 13 and the diaphragm valve seat 12a. Nevertheless, the reinforcing disk 33 raised by the water level 36 applies a closing force to the pilot valve 24 against the valve seat 21 at a greater pressure.

Accordingly, it is advantageous that the diaphragm valve 13 be completely shut off by further closing the diaphragm valve 13 against the valve seat 12a, after some water has leaked from the gap between the diaphragm valve 13 and valve seat 12a.

Figure 4:
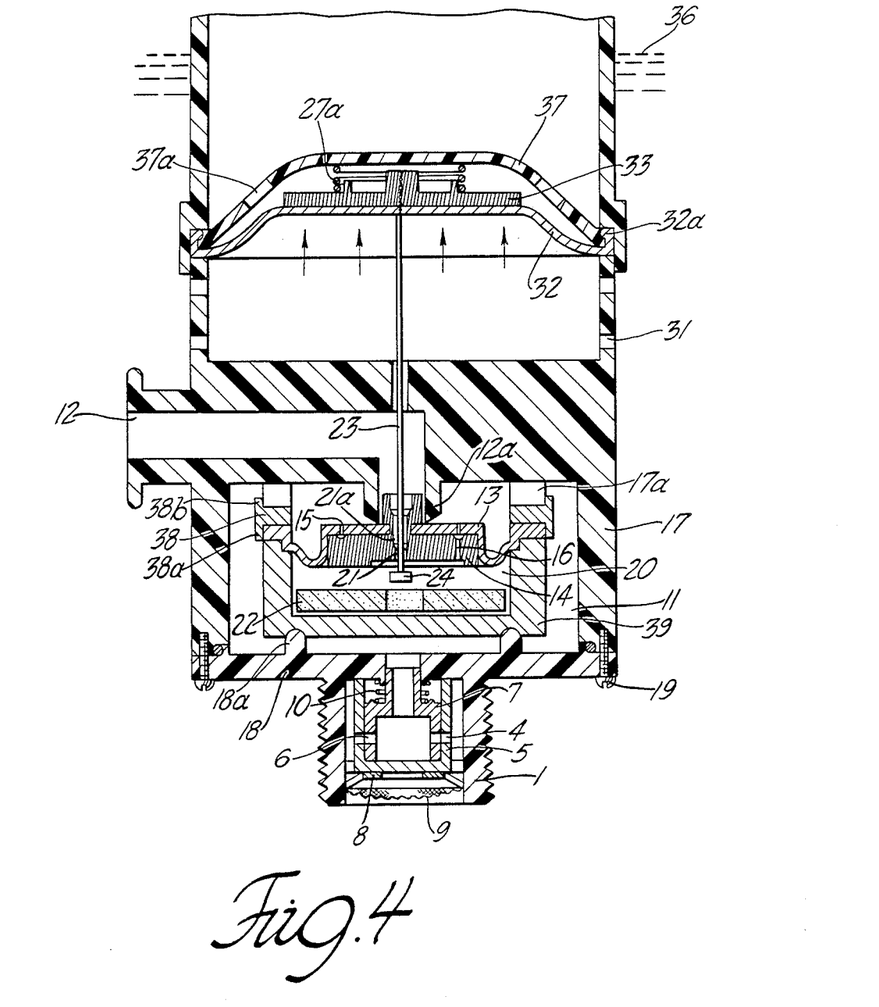
FIG. 4 is a cross-sectional view of an alternative embodiment of the subject invention, similar to that shown in FIG. 3 but with the water being supplied from the lower side.

Referring now to FIG. 4, a cross-sectional view of yet another embodiment of the subject invention is illustrated. This embodiment is particularly adapted for use in an appliance which supplies water from the lower side. The operation of the embodiment may be appreciated fully from that described in connection with FIGS. 2 and 3.

Figure 5:
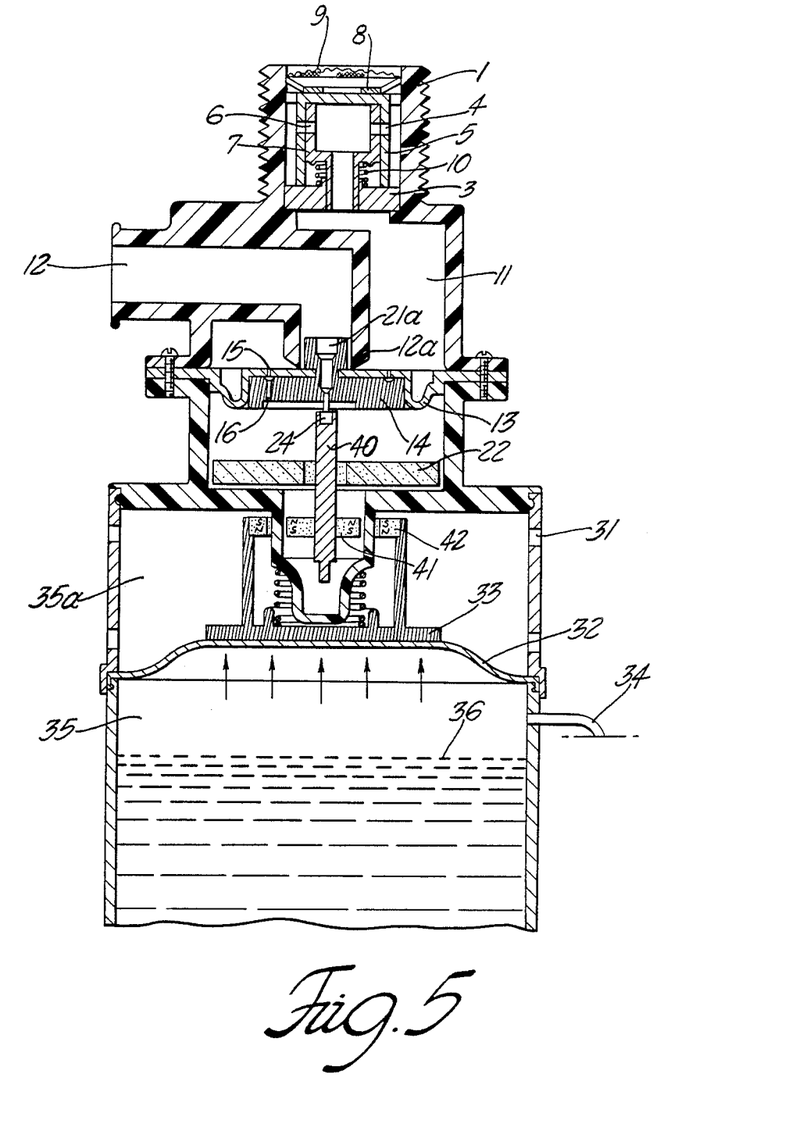
FIG. 5 is a cross-sectional view of yet another alternative embodiment of the subject invention, disposed in the closed state with water being supplied from the upper side and including a magnetically actuated pilot valve.

Referring now to FIG. 5, a still further embodiment of the present invention is illustrated. The invention shown in FIG. 5 includes a pilot valve 24 which is opened and closed by using the attractive force and repulsive force of magnets 41, 42. More specifically, a plunger 40 is connected to the pilot valve 24 and disposed in a central portion of the lower housing 17. The plunger 40 is connected to an inner magnet 41 and adapted to slide up and down along with the inner magnet 41. A pole piece is attached to the reinforced disk 33 of the actuating diaphragm 32. The pole piece is arranged about the outside of the inner magnet 41 and includes an outer magnet 42 disposed to attract the inner magnet 41.

Accordingly, the opening and the closing of the pilot valve 24 is controlled by the up and down movement of the reinforcing disk 33. Preferably, the plunger 40 is made of a non-magnetic material. The operation of the invention embodied in FIG. 5 is apparent from the operation of the various embodiments of the subject invention described above.

Figure 6:
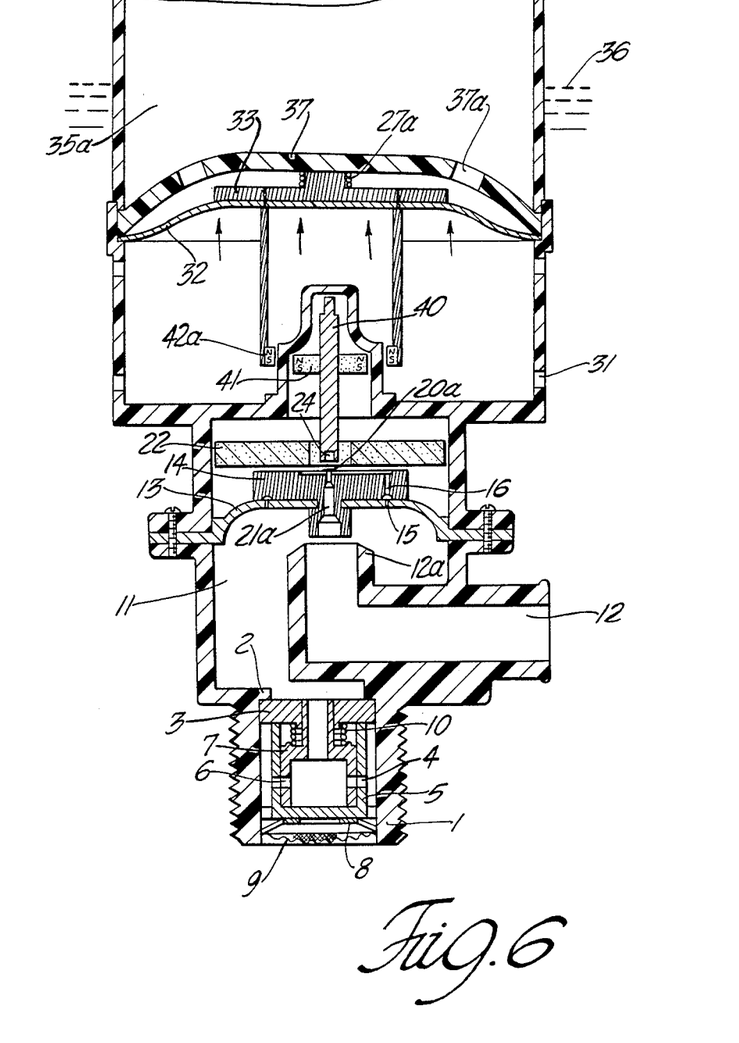
FIG. 6 is a cross-sectional view of an alternative embodiment of the subject invention, similar to that shown in FIG. 5 but with the water being supplied from the lower side.

Referring now to FIG. 6, a further embodiment of the subject invention is disclosed. In this embodiment, water is supplied from the lower side of the unit. In contrast to the embodiment disclosed in FIG. 5, the magnetic pull of the outer magnet 42a is arranged to act in a repulsive force manner with the inner magnet 41.

In operation, when the water level 36 moves downwardly, the outer magnetic 42a linked to the reinforcing disk 33 moves downwardly to interact with the inner magnet 41. However, the inner magnet 41 is restrained from further downward movement because the pilot valve 24 fitted around the plunger 40 is in a closed position with respect to the pilot valve seat 20a. However, when the outer magnet 42a overcomes the repulsive force and moves further downwardly by way of the force of the spring 27a, the relative position between the inner magnet 41 and the outer magnet 42a will change, and the inner magnet 41 will be forced by the repulsive force of the magnets 41, 42a to move upwardly, thereby causing the pilot valve 2 to be opened.

In the embodiment disclosed in FIG. 6, the process of closing the diaphragm valve 13 is similar to that of the opening described above, with the stroke of the outer magnet 42a being predetermined to a longer distance then that of the inner magnet 41.

Figure 7:
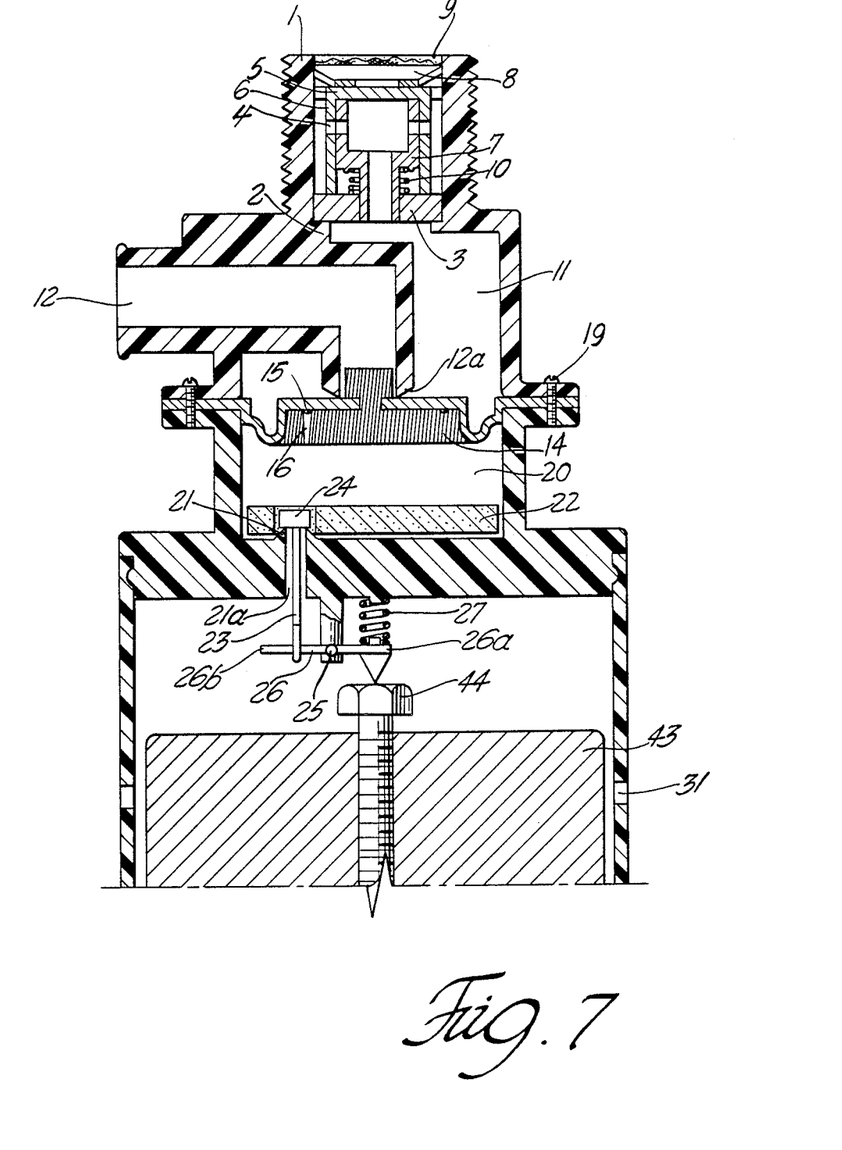
FIG. 7 is a cross-sectional view of the subjection invention as illustrated in FIG. 1a, but including a float actuator in place of an actuating diaphragm.

Referring now to FIG. 7, yet another embodiment of the subject invention is shown including a float 43 in place of the reinforcing disk 33. In all other respects, the embodiment shown in FIG. 7 is substantially identical to that illustrated and described with respect to FIG. 1a. More particularly, the float 43 and the reinforcing disk 33 operate in substantially the same manner to produce substantially the same effect. However, the float 43 includes an adjustable bolt 44 for controlling the water level. It will be appreciated that the embodiment illustrated in FIG. 7 which employs a float 43 is directly applicable to the embodiments in either FIGS. 3 or 5.

Figure 8:
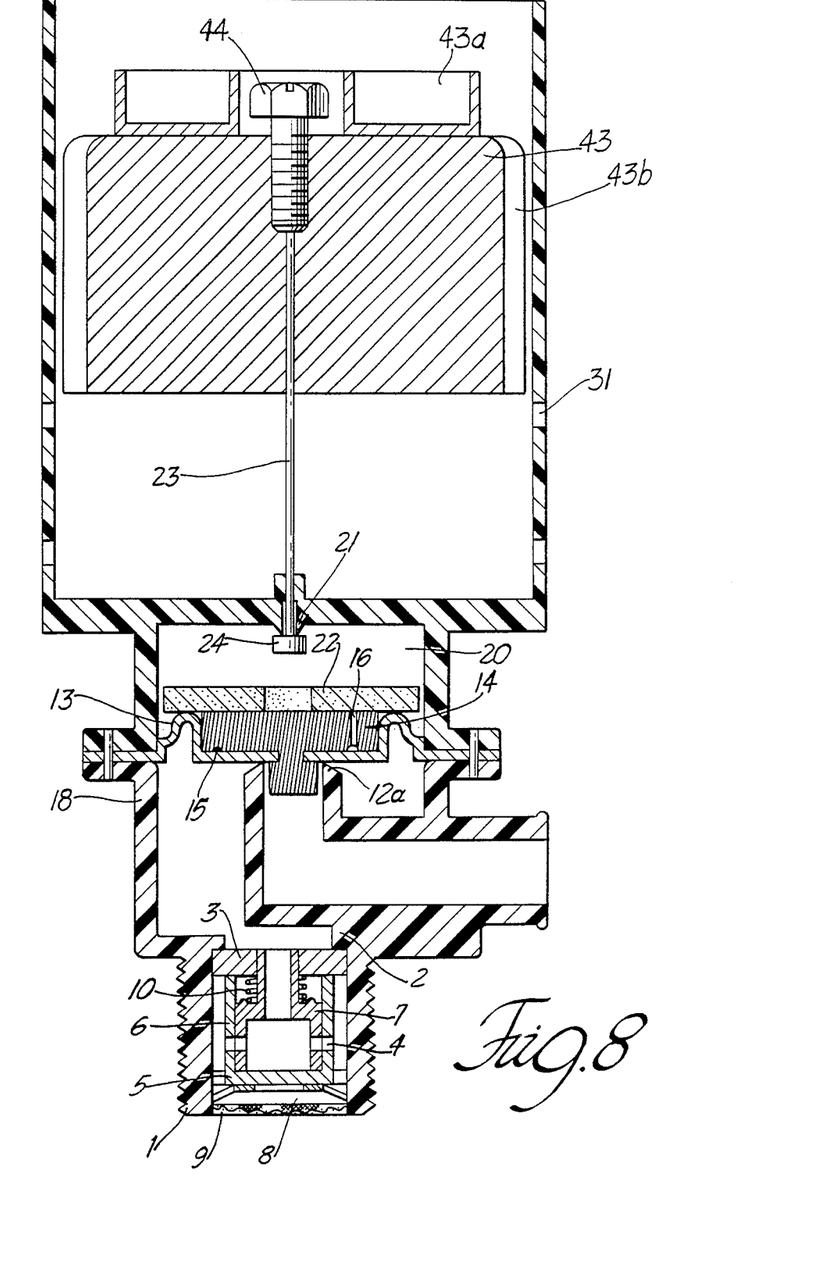
FIG. 8 is a cross-sectional view of the subject invention as illustrated in FIG. 1b, but including a float actuator in place of an actuating diaphragm.

Referring now to FIG. 8, still another embodiment is disclosed for use in an appliance where the water is supplied from the lower side of the unit. The embodiment illustrated in FIG. 8 is substantially identical in operation to that disclosed in FIGS. 2, 4 or 6.

Figure 9:
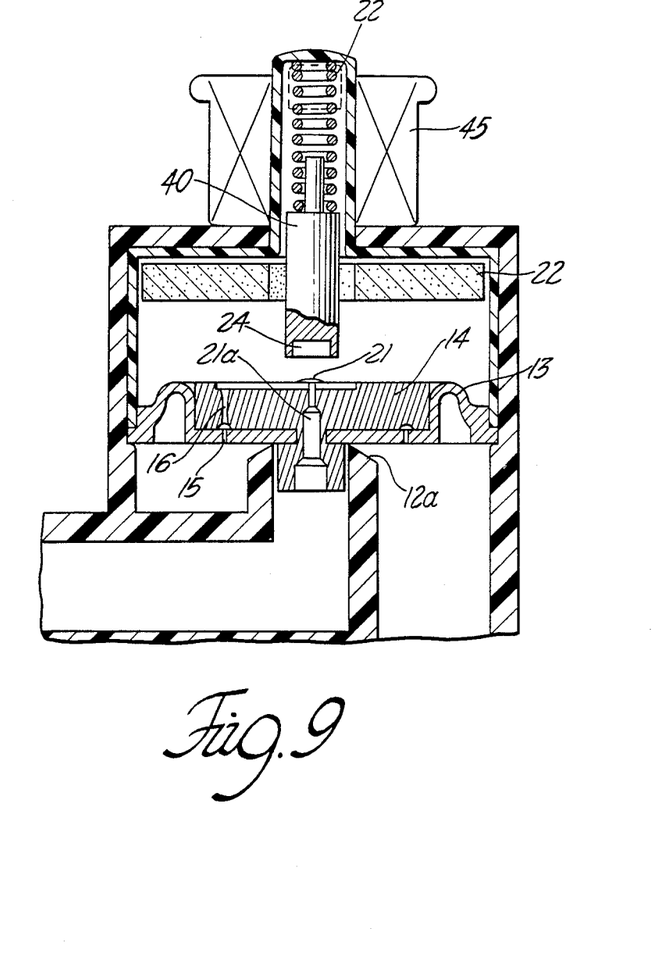
FIG. 9 is a cross-sectional view of yet another alternative embodiment of the subject invention and including a solenoid coil actuator for controlling the pilot valve.

FIG. 9 illustrates a cross-sectional view of the subject invention which provides a cushion body 22 in the pilot pressure chamber 20. A solenoid coil 45 operates the plunger 40 and thereby controls the water supply valve. The cushion body 22 can be disposed in either one of two places.

FIGS. 10a and 10b illustrate the implementation of the subject invention for operation. FIG. 10a shows the subject invention disposed for use in a water tank, wherein the water is supplied from above. FIG. 10b illustrates the subject invention disposed for use in the reservoir of a chamber pot, with the water being supplied from underneath.

The subject invention is advantageously used in a flush valve arrangement because a larger cushion body 22 may be used to cause a delay in the closing time of the diaphragm valve 13, and thereby control the required outflow.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A pilot controlled diaphragm shut-off valve (13) being operated by pressure change from a pilot pressure chamber (20), said valve (13) comprising; a volumetrically deformable elastic cushion body (22) provided in said pilot pressure chamber (20) for a pilot valve (24) being movable between open and closed positions by an actuator (32, 43).

2. A valve as set forth in claim 1 further characterized by said cushion body (22) being disposed inside of said pilot pressure chamber (20) so that gradual reduction of rapid pressure change in said pilot pressure chamber (20) results in a gradual closing velocity of said diaphragm shut-off valve (13).

3. A valve as set forth in claim 1 further characterized by said actuator (32, 43) including an actuating diaphragm (32), said actuating diaphragm (32) being operated by air (35) pressed in an air chamber having a flexible pipe (34) for adjusting water level, and said actuating diaphragm (32) linked to a stem (23), and a lever (26) for moving said pilot valve (24) between open and closed positions against a pilot valve seat (21).

4. A valve as set forth in claim 1 further characterized by said actuator (32, 43) including a float (43) operated by float force and including a bolt (44) for adjusting water level, said float (43) being linked to a stem (23) and a lever (26) for moving said pilot valve (24) between open and closed positions against a pilot valve seat (21).

5. A valve as set forth in claim 1 further characterized by said actuator (32, 43) including float (43) operated by float force and including a bolt (44) for adjusting water level, and a space (43a) for receiving water, said float (43) being linked to a stem (23) for moving said pilot valve (24) between open and closed positions against a pilot valve seat (21).

* * * * *